United States Patent
Ewalts et al.

(10) Patent No.: US 10,518,216 B2
(45) Date of Patent: Dec. 31, 2019

(54) PROCESS AND DEVICE FOR TREATING FURNACE GAS

(71) Applicant: DANIELI CORUS B.V., Velsen Noord (NL)

(72) Inventors: Wouter Bernd Ewalts, Nieuw Vennep (NL); Pieter Dirk Klut, Castricum (NL)

(73) Assignee: DANIELI CORUS B.V., Velsen Noord (NL)

( * ) Notice: Subject to any disclaimer, the term of this patent is extended or adjusted under 35 U.S.C. 154(b) by 0 days.

(21) Appl. No.: 15/772,739

(22) PCT Filed: Nov. 2, 2016

(86) PCT No.: PCT/EP2016/076411
§ 371 (c)(1),
(2) Date: May 1, 2018

(87) PCT Pub. No.: WO2017/076894
PCT Pub. Date: May 11, 2017

(65) Prior Publication Data
US 2018/0311613 A1 Nov. 1, 2018

(30) Foreign Application Priority Data
Nov. 4, 2015 (EP) .................................. 15192974

(51) Int. Cl.
*B01D 53/12* (2006.01)
*B01D 53/40* (2006.01)
(Continued)

(52) U.S. Cl.
CPC ............. *B01D 53/83* (2013.01); *B01D 53/12* (2013.01); *B01D 53/40* (2013.01); *C10K 1/024* (2013.01);
(Continued)

(58) Field of Classification Search
CPC . C21C 2100/00; C21C 2100/02; C21B 7/002; C21B 2100/00; C21B 2100/02; C21B 2100/40; F23J 15/003; F23J 15/02; F23J 2900/00; B01D 53/54; B01D 53/565; B01D 53/81; B01D 53/83; B01D 2257/408; B01D 2258/025; B01D 2258/0283
See application file for complete search history.

(56) References Cited

U.S. PATENT DOCUMENTS

| | | | | |
|---|---|---|---|---|
| 4,243,635 A | * | 1/1981 | Aeberli | B01D 53/34 422/168 |
| 4,501,599 A | * | 2/1985 | Loukos | B01D 53/10 95/109 |

(Continued)

FOREIGN PATENT DOCUMENTS

| | | | | |
|---|---|---|---|---|
| AU | 2 184 502 A | * | 7/2002 | ............ B01J 8/004 |
| CN | 104039424 B | * | 11/2017 | ............ B01D 53/56 |

(Continued)

OTHER PUBLICATIONS

International Search Report dated Jan. 16, 2017 for corresponding International Application PCT/EP2016/076411, filed Nov. 2, 2016.
(Continued)

*Primary Examiner* — Timothy C Vanoy
(74) *Attorney, Agent, or Firm* — Steven M. Koehler; Westman, Champlin & Koehler, P.A.

(57) ABSTRACT

A process and a device for treating a flow of furnace gas with a pressure of more than 1 bar flowing through a channel. A powder agent, such as a powder comprising alkali reagents, such as lime, and/or absorbents, such as activated coal, is injected under an overpressure into the furnace gas flow via an injector which is positioned centrally within the channel. The powder agent may be fluidized. The pressure for injecting the powder may be adjusted by controlling the volume of fluidization gas vented via a venting outlet.

16 Claims, 1 Drawing Sheet

(51) Int. Cl.
*B01D 53/83* (2006.01)
*C10K 1/02* (2006.01)
*C10K 1/32* (2006.01)
*C21B 7/00* (2006.01)
*C21C 5/40* (2006.01)
*F27D 17/00* (2006.01)
*F27B 1/10* (2006.01)
*F27B 3/10* (2006.01)

(52) U.S. Cl.
CPC ............... *C10K 1/32* (2013.01); *C21B 7/002* (2013.01); *C21C 5/40* (2013.01); *F27B 1/10* (2013.01); *F27B 3/10* (2013.01); *F27D 17/008* (2013.01); *B01D 2251/404* (2013.01); *B01D 2253/102* (2013.01); *B01D 2257/60* (2013.01); *B01D 2257/7027* (2013.01); *B01D 2258/025* (2013.01); *B01D 2259/128* (2013.01); *C21B 2100/44* (2017.05); *C21C 2100/02* (2013.01)

(56) References Cited

U.S. PATENT DOCUMENTS

| | | | | |
|---|---|---|---|---|
| 4,889,698 | A * | 12/1989 | Moller | B01D 53/34 423/210 |
| 8,765,087 | B2 * | 7/2014 | Takagi | B01D 53/62 423/226 |
| 2008/0241037 | A1 * | 10/2008 | Lindau | B01D 53/507 423/243.08 |
| 2011/0041517 | A1 * | 2/2011 | Takagi | B01D 53/62 62/4 |
| 2012/0299205 | A1 * | 11/2012 | Lee | B01D 53/9409 261/27 |
| 2015/0165367 | A1 * | 6/2015 | Boos | B01D 53/1418 110/345 |

FOREIGN PATENT DOCUMENTS

| | | | | |
|---|---|---|---|---|
| DE | 2520045 | A1 | 11/1976 | |
| EP | 0 543 705 | A1 * | 5/1993 | |
| EP | 2 545 334 | B1 * | 5/2018 | ............ B01D 53/81 |
| WO | 0250485 | A1 | 6/2002 | |
| WO | 2010034791 | A1 | 4/2010 | |

OTHER PUBLICATIONS

Written Opinion of the International Searching Authority dated Jan. 16, 2017 for corresponding International Application PCT/EP2016/076411, filed Nov. 2, 2016.

* cited by examiner

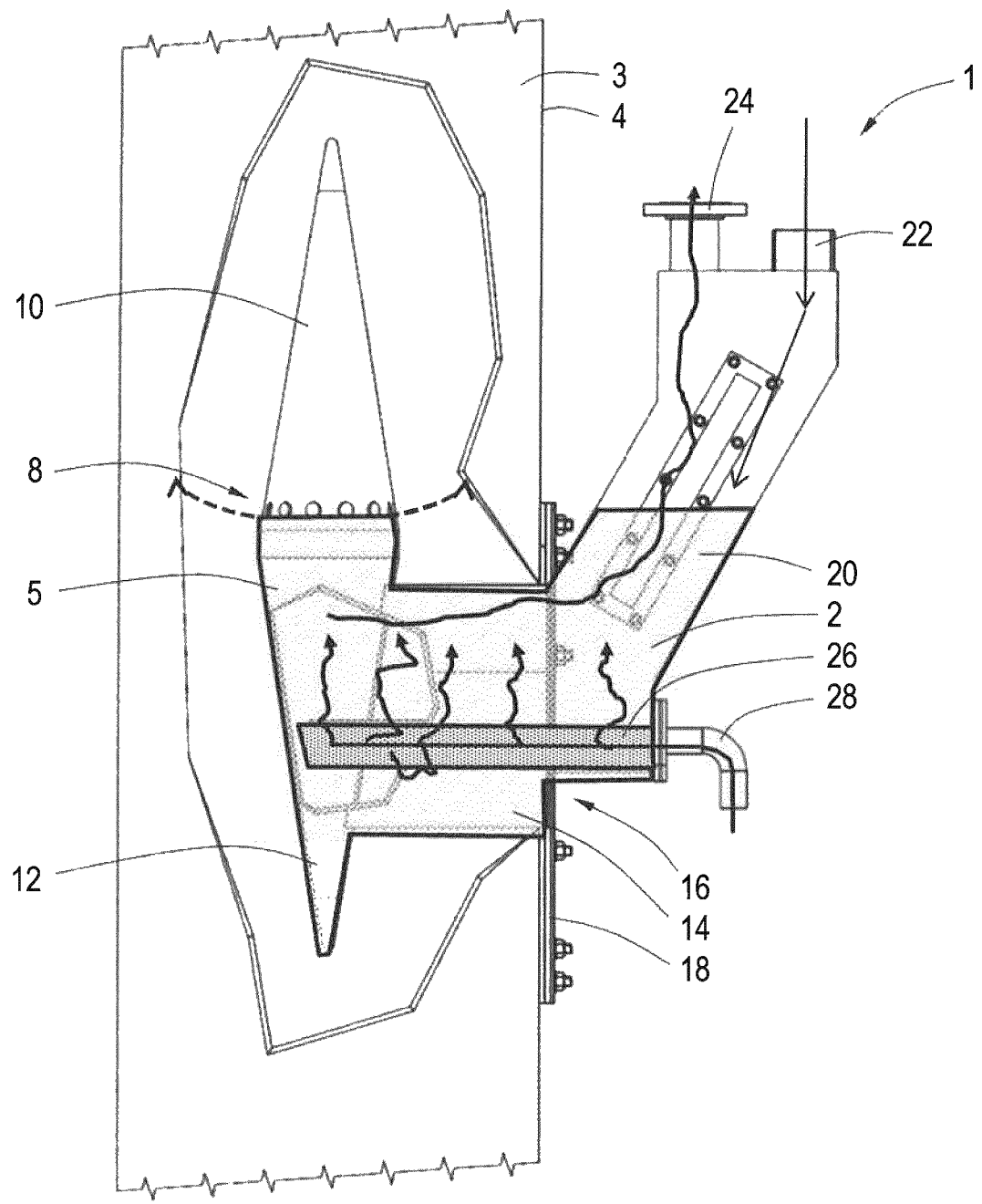

PROCESS AND DEVICE FOR TREATING FURNACE GAS

CROSS REFERENCE TO RELATED APPLICATION

The present application is a national stage of International patent application Ser. No. PCT/EP2016/076411, filed Nov. 2, 2016, and published in English as WO 2017/076894 A1.

TECHNICAL FIELD

The discussion below is merely provided for general background information and is not intended to be used as an aid in determining the scope of the claimed subject matter. Aspects of the invention relate to a process and a device for treating a furnace gas emanating from steel or iron production processes, such as blast furnace gas or gas produced with electric arc furnaces (EAF), basic oxygen furnaces (BOF) or with direct reduced iron (DRI) processes.

BACKGROUND

Blast furnace gas typically has a relatively high carbon monoxide content, e.g., about 20-28%, allowing use as a fuel gas in various types of burners. However, the dust content of blast furnace gas leaving the blast furnace is too high for a stable functioning of the burners, so the dust content of the blast furnace gas must be lowered substantially. This is usually done with a two-step process. In a first step the larger dust particles are separated in a cyclone. In a second step the smaller particles are separated, usually by means of a scrubber in a wet process. Such a wet process requires significant water consumption and produces sludge and waste water, which require further treatment. The water scrubbing treatment also results in a drop of pressure and temperature of the treated blast furnace gas, which reduces its efficiency as a fuel gas in a downstream gas burner.

To overcome the drawbacks of wet gas cleaning processes it has been proposed to filter the gas by means of filter bags, for instance in WO 2010/034791, which also teaches top remove contaminants before filtering. Fresh blast furnace gas typically comprises a number of acidic contaminants, such as hydrogen chloride, hydrogen fluoride, and hydrogen sulfide. In WO 2010/034791 these contaminants are removed by injecting alkaline agents into the gas flow. Other typical contaminants of blast furnace gas include polycyclic aromatic hydrocarbons (PAH), benzene, toluene and xylene (BTX). These can be removed by injecting absorbents into the blast furnace gas flow, e.g., as a mixture with the reagents for neutralizing the acidic contaminants. A problem encountered with injecting such agents in powder form is that the powder should be distributed evenly over the passing gas flow.

U.S. Pat. No. 4,501,599 discloses a dry scrubber for removing pollutants from aluminum production process emissions, using alumina particles. The pressure in such aluminum production process gas is typically sub-atmospheric, so the alumina is sucked into the passing gas flow.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Aspects of the invention provide a system for cleaning furnace gas emanating from steel production processes enabling a more efficient removal of contaminants, typically in high pressure gas flows with pressures of more than 1 bar; and a process for treating a flow of furnace gas with a pressure of more than 1 bar flowing through a channel by injecting a powder agent under an overpressure into the furnace gas flow, wherein the powder is added to the gas flow via an injector which is positioned centrally within the channel. It was found that injection from a central point in the channels results in improved distribution of the powder agent over the gas flow.

Distribution of powder particles is further improved if the powder agent is fluidized before it is injected. To this end it may be dispensed from a chamber comprising a fluidizing bed using a fluidizing gas, such as nitrogen or blast furnace gas.

The pressure for injecting the powder agent can be adjusted, e.g., by controlling the volume of fluidization gas vented via a venting outlet.

The powder agent may for instance be injected into the gas flow in radial direction, e.g., via a ring of radially directed outlets.

The powder agent may for instance comprise one or more absorbents and/or one or more alkaline compounds. Alkaline compounds serve to remove acidic components from the gas flow. Suitable alkaline compounds include calcium carbonate, sodium carbonate (soda), hydrated lime or mixtures thereof. Absorbent agents can be used to remove other typical contaminants of blast furnace gas, such as heavy metals, polycyclic aromatic hydrocarbons, benzene, toluene or xylene. Suitable absorbents may for instance comprise activated carbon, lignite coke or a fine grade zeolite.

The amount of agent injected into the gas flow depends on the concentration of the pollutants. A stoichiometric rate for the alkali agent will be between 1.5-4. Typical concentrations for activated carbon are for example between 50-250 $mg/Nm^3$.

The used fluidization gas may for example be nitrogen, recycled clean blast furnace gas, or any other suitable inert gas. The amount of fluidization gas used for fluidization of the agent may for example be at least 150 liter, e.g., between about 200-500 liter per ton of agent.

The powder agent is injected into the gas flow with a net overpressure of at least about 10 mbar, e.g. at least about 20 mbar, e.g., up to at most 500 mbar or up to at most 400 mbar, relative to the pressure in the passing furnace gas flow, which is typically at least about 1.5 bar, e.g., at least about bar.

The temperature of the furnace gas will typically be about at least 100° C., e.g., at most 250° C., e.g., about 200° C.

The furnace gas flow can for example subsequently be filtered, e.g., by means of filter bags or similar filters.

The channel defining the blast furnace flow path may be vertical or non-vertical, e.g., horizontal. Good results are obtained if the channel is vertical and the furnace gas flow path is upward.

Surprisingly it was found that the NOx emission of the iron or steel production process was substantially reduced using the process. It is believed that this is caused by the effective removal of hydrogen cyanide from the treated gas. Hence, the present disclosure also relates to a method of reducing NOx emission by iron or steel production process, from HCN containing furnace gas emanating from this process is treated by injecting a powder agent comprising alkaline components, such as lime powder, e.g., as described above or below.

The disclosed process may for example be carried out using a device for treating a flow of blast furnace gas by injecting a powder agent. The device comprises a flow channel and an injector centrally arranged within the flow channel. The injector is provided with radially directed outlets and a chamber for containing a fluidized bed of a powder agent with a supply for a fluidizing gas.

Optionally, a vent may connect the chamber to a fluidizing gas discharge outside the channel. The vent can for example be adjustable enabling to control the volume of vented fluidization gas. This makes it possible to control the injection velocity of the powder agent when it is injected into the gas flow.

The supply for a fluidizing gas may for example comprise at least one air permeable conduit, for instance a conduit of sintered metal or of a filter mesh metal. To achieve equal fluidization over the fluidized bed, the conduit may extend over the width and/or length of the fluidizing bed. Alternatively, the fluidization gas may be supplied via a gas permeable bottom plate supporting the powder bed.

Optionally, the conduit is removable from the fluidization chamber for maintenance, cleaning or repair purposes.

To avoid turbulence and to minimize pressure drop in the furnace gas flow the device may for instance comprise a downstream conical section extending in flow direction from the radial outlets. The device may also comprise an upstream conical section extending from the radial outlets in a direction opposite to the flow direction.

The channel will typically be cylindrical with the injector being coaxial with the channel. The radial outlets may form a circular array, also being coaxial relative to the channel.

BRIEF DESCRIPTION OF THE DRAWINGS

Aspects of the invention will be explained with reference to the accompanying drawing, showing an exemplary embodiment.

FIG. 1: shows a device for treating blast furnace gas in longitudinal cross section.

DETAILED DESCRIPTION OF THE ILLUSTRATIVE EMBODIMENT

FIG. 1 shows a device 1 for treating a flow of blast furnace gas by injecting a dry powder agent 2 containing absorbent material, such as active carbon, and an alkaline agent, such as lime. The device 1 comprises a flow channel 3 defining a blast furnace gas flow path with a flow direction A. The channel 3 has a channel wall 4, typically a cylindrical channel wall. An injector 6 is arranged centrally within the flow channel 3. To show the injector 6, part of the wall 4 is broken away in FIG. 1. The injector 6 is provided with a ring of radially directed outlets 8. A first hollow conical section 10 of the injector 6 extends from the section with the radial outlets 8 and points downstream. A second hollow conical section 12 of the injector 6 extends in the opposite direction from the section with the radial outlets 8 and points upstream. The conical sections 10, 12 guide the blast furnace gas flow to minimize turbulence caused by the injector 6. Alternative configurations can also be used.

The hollow interior of the second conical section 12 forms part of a fluidization chamber 14 containing the powder agent 2. The fluidization chamber 14 connects to an opening 16 in the channel wall 4 where the injector 6 is bolted to the channel wall by means of a flange connection 18. Outside the channel 3 the fluidization chamber 14 is extended with a section 20 connected to a powder inlet 22 for the supply of fresh powder agent, and an outlet 24 for venting fluidization gas substantially above the powder bed level in the fluidization chamber 14.

The section of the chamber 14 between the conical section 12 and the channel wall 4 may have an aerodynamic cross section, e.g., pointing upwardly and pointing downwardly.

A gas permeable conduit 26 of a sintered metal is positioned in a bottom section of the fluidization chamber 14 over the width and length of the fluidization chamber 14, e.g., extending from a fluidization gas inlet 28 at least to a center line of the second conical section 12.

When the fluidization chamber 14 is filled with the powder agent 2, fluidization gas is blown into the fluidization chamber 14 through the powder bed. As a result the powder bed is fluidized. Powder escapes through the outlets 8 and is taken with the blast furnace gas flow A.

The powder agent 2 is injected under pressure into the blast furnace gas flow A. The pressure can be adjusted by controlling the volume of the fluidization gas vented via the outlet 24.

The invention claimed is:

1. A process for treating a flow of furnace gas with a pressure of more than 1 bar flowing through a channel, wherein a powder agent is injected into the furnace gas flow, wherein the powder agent is first fluidized in a fluidized bed and then added to the furnace gas flow via an injector which is positioned centrally within the channel, and wherein an injection velocity of the powder agent is adjusted by controlling a volume of fluidization gas vented via a venting outlet.

2. The process of claim 1, wherein the powder agent is radially injected into the furnace gas flow.

3. The process of claim 1, wherein the powder agent comprises one or more absorbents.

4. The process of claim 1, wherein the furnace gas flow is subsequently filtered.

5. The process of claim 1, wherein the powder agent comprises one or more alkaline components.

6. The process of claim 5, wherein the powder agent comprises one or more absorbents.

7. The process of claim 1, wherein the powder agent is injected under an overpressure into the furnace gas flow.

8. A device for treating a flow of furnace gas, the device comprising:
   a flow channel and an injector centrally arranged within the flow channel and provided with radially directed outlets, the injector comprising a chamber configured to contain a fluidized bed of a powder agent with a supply for a fluidizing gas configured to blow the powder agent via the radially directed outlets into the furnace gas flow; and
   a vent connecting the chamber to a fluidizing gas discharge outside the flow channel, wherein the vent is adjustable to control an injection velocity of the powder agent when it is injected into the furnace gas flow.

9. The device of claim 8, wherein the supply for the fluidizing gas comprises at least one gas permeable conduit.

10. The device of claim 9, wherein the at least one gas permeable conduit extends over a width and/or length of the fluidizing bed.

11. The device of claim 9, wherein the at least one gas permeable conduit is of a sintered metal.

12. The device of claim 9, wherein the at least one gas permeable conduit is retractable.

13. The device of claim 9, wherein the at least one gas permeable conduit is a filter mesh metal.

14. The device of any one of claim 8, comprising a downstream conical section extending in a flow direction from the radially directed outlets.

15. The device of any one of claim 8, comprising an upstream conical section extending from the radially directed outlets in a direction opposite to a flow direction.

16. The device of claim 8, wherein the injector is configured to blow the powder agent via the radially directed outlets into the furnace gas flow with an overpressure of at least 10 mbar relative to a pressure in the furnace gas flow.

* * * * *